(12) United States Patent
Matsuse

(10) Patent No.: US 9,146,933 B2
(45) Date of Patent: Sep. 29, 2015

(54) COMPRESSED STORAGE ACCESS SYSTEM WITH UNCOMPRESSED FREQUENT USE DATA

(71) Applicant: International Business Machines Corporation, Armonk, NY (US)

(72) Inventor: Shuhsaku Matsuse, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 13/721,562

(22) Filed: Dec. 20, 2012

(65) Prior Publication Data

US 2013/0166519 A1 Jun. 27, 2013

(30) Foreign Application Priority Data

Dec. 22, 2011 (JP) ................................ 2011-282034

(51) Int. Cl.
*G06F 17/30* (2006.01)
*G06F 12/08* (2006.01)
*G06F 3/06* (2006.01)

(52) U.S. Cl.
CPC ........ *G06F 17/30153* (2013.01); *G06F 3/0611* (2013.01); *G06F 3/0659* (2013.01); *G06F 3/0683* (2013.01); *G06F 12/0871* (2013.01); *G06F 12/0893* (2013.01); *G06F 17/30946* (2013.01); *G06F 2212/27* (2013.01); *G06F 2212/401* (2013.01)

(58) Field of Classification Search
None
See application file for complete search history.

(56) References Cited

U.S. PATENT DOCUMENTS

| 6,564,305 | B1* | 5/2003 | Moore .......................... 711/154 |
| 6,779,100 | B1 | 8/2004 | Keltcher et al. |
| 2005/0071579 | A1 | 3/2005 | Luick |
| 2012/0221774 | A1* | 8/2012 | Atkisson et al. .............. 711/103 |
| 2013/0007358 | A1* | 1/2013 | Hu et al. ....................... 711/108 |

FOREIGN PATENT DOCUMENTS

| CN | 103999061 A | 8/2014 |
| DE | 112012005383 T5 | 9/2014 |
| GB | 2510523 A | 8/2014 |

(Continued)

OTHER PUBLICATIONS

Tanaka, "Information Materials for IDS," Feb. 2012, p. 1, Japan Patent Application Serial No. 2011-282034.

(Continued)

*Primary Examiner* — Jared Rutz
*Assistant Examiner* — William E Baughman
(74) *Attorney, Agent, or Firm* — Patricia B. Feighan; Yuanmin Cai

(57) ABSTRACT

Storage system that includes: an address search section for i) storing an address for frequent use data and a data index assigned to the address, ii) acquiring an address of write or read data, and iii) searching stored addresses with the acquired address, a frequent use data storage section for i) storing a tag related to the use data and the index, ii) acquiring the index when an address acquired by the search section has hit a stored address, and iii) identifying frequent use data that corresponds to the tag, a data comparator for i) acquiring the frequent use data from the storage section, ii) comparing the data with write data, and iii) identifying frequent use data that hit the write data, and an compression-expansion section for acquiring and compressing the write data and the frequent use data from the comparator, and for acquiring the read data.

11 Claims, 7 Drawing Sheets

(56) References Cited

FOREIGN PATENT DOCUMENTS

| | | | |
|---|---|---|---|
| JP | 5073213 A | 3/1993 | |
| JP | 5189360 A | 7/1993 | |
| JP | 5204747 | 8/1993 | |
| JP | 07160430 A | 6/1995 | |
| JP | 3019351 U | 12/1995 | |
| JP | 09212505 A | 8/1997 | |
| JP | 09219647 A | 8/1997 | |
| JP | 10260896 A | 9/1998 | |
| JP | 11024974 A | 1/1999 | |
| JP | 2000029756 A | 1/2000 | |
| JP | 2000066844 A | 3/2000 | |
| JP | 2000163264 A | 6/2000 | |
| JP | 2002049512 A | 2/2002 | |
| JP | 2002132546 A | 5/2002 | |
| JP | 2002140227 A | 5/2002 | |
| JP | 2007094639 | 4/2007 | |
| JP | 2009289196 A | 12/2009 | |
| JP | 2011048679 A | 3/2011 | |
| JP | 2012014493 A | 1/2012 | |
| JP | 5629392 B2 | 11/2014 | |
| WO | 2013094280 A1 | 6/2013 | |

OTHER PUBLICATIONS

Tanaka, "Information Materials for IDS," Jun. 27, 2014, p. 1-2, Japan Patent Application Serial No. 2013-550163.

Matsuse, "Storage Device Access System," English Translation Application and Drawings, Filed on Dec. 22, 2011, p. 1-22, Japan Patent Application Serial No. 2011-282034.

The International Bureau of WIPO, "Notification Concerning Transmittal of International Preliminary Report on Patentability," Jul. 3, 2014, International Application No. PCT/JP2012/075606.

UK Intellectual Property Office, "Examination Report under Section 18(3)," Jun. 18, 2014, International Application No. GB1408611.0.

Information Materials for IDS from International Search Report dated Dec. 18, 2012 from PCT Application JP2012/075606 filed Oct. 3, 2012.

Information Materials for IDS for Japan Application 2011-282034 filed Dec. 22, 2011.

* cited by examiner

COMPRESSED STORAGE ACCESS SYSTEM WITH UNCOMPRESSED FREQUENT USE DATA

This application claims priority under 35 U.S.C. §119 from Japanese Patent Application No. 2011-282034 filed Dec. 22, 2011, the entire contents of which are incorporated herein by reference.

BACKGROUND OF THE INVENTION

1. Field of the Invention

This invention relates to storage device access systems for writing data to or reading data from a storage device, and it particularly relates to storage device access systems that provide data compression-expansion functions.

2. Related Art

Formerly, in order to more efficiently store data in a storage device, systems compressed (encoded) data when writing and expanded (decoded) data when reading.

For example, in Japanese Laid-Open Publication No. H05-204747 and Japanese Laid-Open Publication No. 2007-94639 there is disclosed a semiconductor storage device arranged to write data with compression and read data with expansion, by establishing data compression-expansion functions.

In Japanese Laid-Open Publication No. 2002-49512 there is disclosed a file compression processing device that enables high speed playback of files without performing compression of the files, and enables efficient file usage by selecting a suitable compression method based on the type of file and frequency of access.

In Japanese Laid-Open Publication No. 2000-29756 there is disclosed a file compression processing device that enables preventing a drop in processing performance through reducing the operation time required for opening files by not compressing files with high access frequency, and that enables administering files with a storage capacity above actual capacity by compressing files with low access frequency.

From the viewpoint of storage capacity, it is preferable to write all data with compression and read all data with expansion to and from the storage device, but conventionally, in consideration of processing performance, data is stored (written) to storage as is without compression, based on there being much open capacity and high usage frequency. Accordingly, in regards to writing data with compression and reading data with expansion, it was performed only to facilitate usage of the storage capacity and was not performed to raise the writing and reading speed.

SUMMARY OF THE INVENTION

An aspect of the invention includes a storage device access system for writing and reading data relative to a storage device. The system includes: an address search section for i) storing an address for a plurality of frequent use data and a data index assigned to the address, ii) acquiring the address of write or read data, and iii) searching stored addresses with the acquired address, a frequent use data storage section for i) storing a tag related to the plurality of frequent use data and the data index, ii) acquiring the data index when an address acquired by the address search section has hit a stored address, and iii) identifying frequent use data that corresponds to the tag related to the acquired data index, a data comparator for acquiring the frequent use data from the frequent use data storage section, iii) comparing the data with the write data, and iii) identifying frequent use data that has hit the write data, a compression-expansion section for i) acquiring and compressing the write data and the frequent use data from the data comparator, and ii) acquiring and expanding the read data from the storage device, a write data selector for i) acquiring the write data and the frequent use data compressed by the compression-expansion section, ii) receiving an instruction from the data comparator, and iii) selecting either of the compressed write data or the frequent use data, and a read data selector for i) acquiring from the frequent use data storage section the identified read data within the frequent use data when the address of the read data has hit the storage address of the address search section, ii) acquiring the read data read from the storage device and expanded by the compression-expansion section when the data does not hit, iii) selecting either the identified read data or the expanded read data under an instruction from the address search section.

DETAILED DESCRIPTION OF THE PREFERRED EMBODIMENTS

Figure 1:
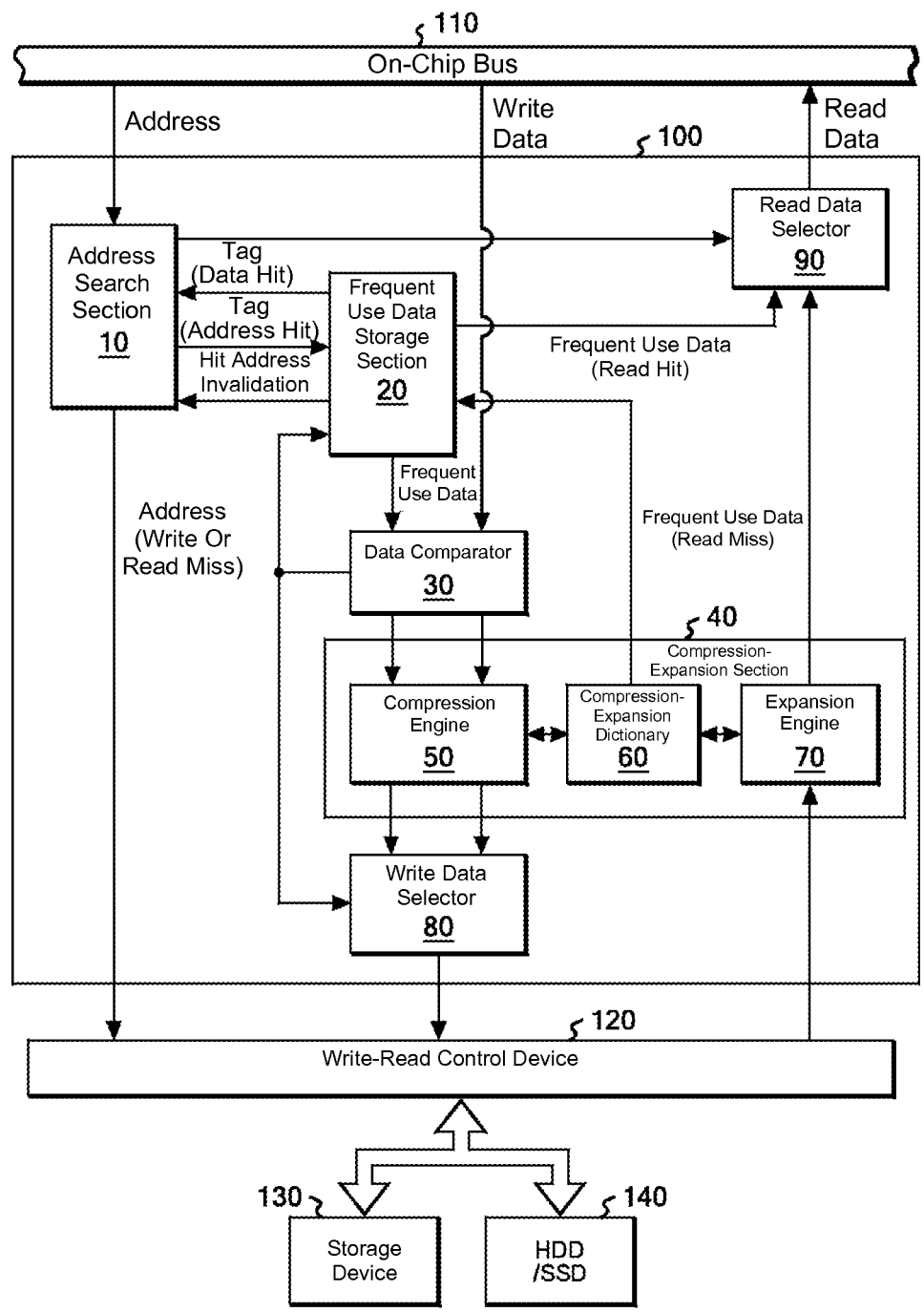
FIG. 1 is a drawing that shows a structural example of the storage device access system according to an embodiment of the present invention.

This invention has a purpose of realizing a storage device access system that not only enables efficient use of storage capacity of the storage device but also enables raising the writing and reading speed. Within the purpose of this invention there is included the offering of such a storage device access system.

The storage device access system of the first embodiment offered by this invention is structured to comprise the following. Specifically, it comprises an address search section for storing an address for a plurality of frequent use data and a data index assigned to the address, for acquiring the address of write or read data, and for searching stored addresses with the acquired address; a frequent use data storage section for storing a tag related to the plurality of frequent use data and the data index, for acquiring the data index when an address acquired by the address search section has hit a stored address, and for identifying frequent use data that corresponds to the tag related to the acquired data index; a data comparator for acquiring the frequent use data from the frequent use data storage section, for comparing the data with the write data, and for identifying frequent use data that has hit the write data; a compression-expansion section for acquiring and compressing the write data and the frequent use data from the data comparator, and for acquiring and expanding the read data from the storage device; a write data selector for acquiring the write data and the frequent use data compressed by the compression-expansion section, for receiving an instruction from the data comparator, and for selecting either of the compressed write data or the frequent use data; and, a read data selector for acquiring from the frequent use data storage section the identified read data within the frequent use data when the address of the read data has hit the storage address of the address search section, for acquiring the read data read from the storage device and expanded by the compression-expansion section when the data does not hit, for selecting either the identified read data or the expanded read data under an instruction from the address search section.

Preferably, when the frequent use data storage section has been instructed by the data comparator that the write data has hit the frequent use data, the frequent use data storage section notifies the address search section of the tag for the hit frequent use data, and instructs overwriting of the stored address with the oldest tag in the address search section to the acquired address; and, when the frequent use data storage section has been instructed by the data comparator that the acquired address has hit the stored address in the address search section but the write data has not hit the frequent use data identified by the corresponding tag, the frequent use data storage section instructs the address search section to perform invalidation of the hit stored address.

Preferably, the address search section comprises a table possessing for each entry an address field for storing the address, a flag field for storing a flag that shows the number of times write or read has been performed for the address, and a data index field for storing a data index for the address of the address field, and the table is constituted of a plurality of entries.

Preferably, when the frequent use data storage section has instructed the address search section to perform invalidation of the hit stored address, the flag in the flag field of the entry for the hit stored address is set to a prescribed value that expresses invalidation.

Preferably, the frequent use data storage section comprises a table possessing for each entry a tag field for storing the tag, and a frequent use data field for storing frequent use data corresponding to the tag of the tag field, and the table is constituted of a plurality of entries.

Preferably, the frequent use data field stores data for a basic data length with high frequent use that is recorded in the storage device.

Preferably, the data comparator comprises a plurality of comparators for comparing each corresponding frequent use data with the write data.

Preferably, the compression-expansion section comprises a compression engine providing at least one compression circuit for compressing the write data and the read data, an expansion engine providing at least one expansion circuit for expanding the read data from the storage device, and a compression-expansion dictionary section providing at least one data encoding support table for supporting encoding to expand with an expansion circuit the data compressed by the compression circuit.

Preferably, there is providing of the data encoding support table for supporting correspondence between the expansion circuit and the compression circuit, and the data of the data encoding support table is frequent use data stored in the frequent use data storage section.

Preferably, the write data selector comprises a selector for selecting, in response to an instruction from the data comparator, either of the compressed write data or the frequent use data.

Preferably, the read data selector comprises a selector for selecting, in response to an instruction from the data comparator, either of the identified read data or the expanded read data.

By use of this invention, there is realized a storage device access system that not only enables efficient use of storage capacity of the storage device but also enables raising the writing and reading speed. In particular, there is ability to raise the writing and reading speed for frequently used data within the storage device, even when writing data with compression and reading data with expansion.

The following section describes in detail an optimal mode for implementing this invention, based on the drawings, but the following implementation mode does not limit this invention according to the Scope of Claims, nor is there a limitation in the form of requiring that the entire combination of characteristics described within the embodiment be present within the solving means of the invention. This invention can be executed in many differing modes, and it should not be interpreted as being limited to the content within the recorded embodiment. Moreover, the same symbols are used for the same structural sections and structural elements throughout the entire description of the embodiment.

FIG. 1 is a drawing that shows a structural example of the storage device access system according to a first embodiment of this invention. Access system 100 is disposed between on-chip bus 110, being such as a PLB (processor local bus), and write-read control device 120 for the storage device. The storage device can be of any type. For example, it can be a storage device such as a cache or memory disposed within the chip, or it can be a storage device such as an HDD (hard disk drive) or SSD (solid state drive) disposed outside the chip. In FIG. 1, there is shown storage device 130 and HDD/SSD 140, for example. Each address and write data is provided to access system 100 from on-chip bus 110 through an address line and a data line, and read data is provided from access system 100 to on-chip bus 110 through a data line.

Within access system 100 there is included: address search section 10; frequent use data storage section 20; data comparator 30; compression-expansion section 40 which provides compression engine, 50, compression-expansion dictionary 60, and expansion engine 70; write data selector 80; and read data selector 90.

An address is input to address search section 10. Address search section 10 maintains an address for each of a plurality of frequent use data within storage device 130 or HDD/SSD 140 as well as a data index assigned to each address. The plurality of frequent use data, which can be specified in advance, is for example A110 or A111 as a 32-bit continuation of 0 or 1, or is a data pattern obtained by analyzing the execution code when compiling a program; and, an address for frequent use data is prepared and stored in address search section 10.

Figure 2:
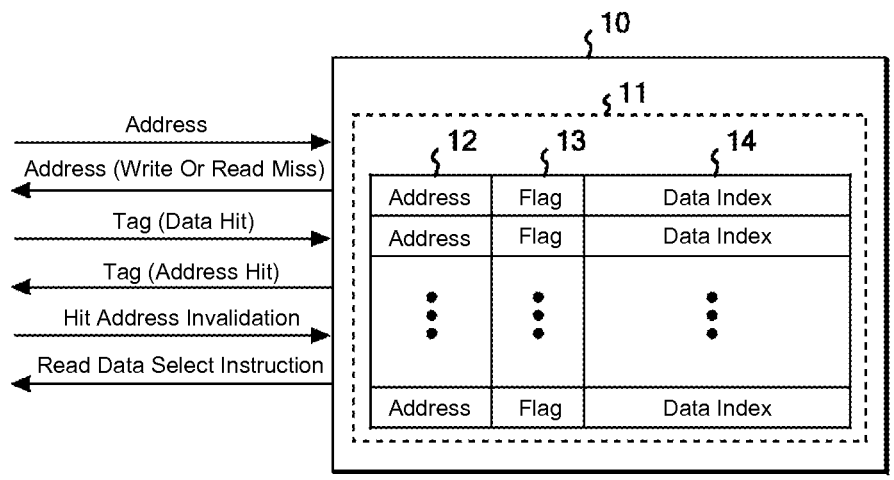
FIG. 2 is a drawing that shows a structural example of the address search section in the storage device access system according to an embodiment of the present invention.

FIG. 2 shows a structural example of address search section 10. Address search section 10 comprises table 11 constituted of a plurality of entries. The entry quantity can be discretionarily set, but it is preferable to set it corresponding to the address quantity for frequent use data stored in address search section 10. Within each entry in table 11, there is established address field 12 for storing the address, data index field 14 for storing a data index for the address of address field 12, and flag field 13 for storing a flag that shows the number of times that writing or reading has been performed for the address of address field 12. Table 11 can be structured by CAM (content addressable memory) or RAM (random access memory). Address field 12 is structured by CAM in order to speed address search, and flag field 13 and data index field 14, which correspond to address field 12, are structured by RAM.

For each entry, within address field 12 there is prepared and stored an address for frequent use data, in the same format as the full-bit address provided by the address line from on-chip bus 110, for example. Flag field 13 is a counter bit for storing the number of times that writing or reading has been performed for the address of address field 12. The flag of flag field 13 enables storing the history for the address of address field 12, and it automatically captures the access frequency for frequent use data specified by the address at the time of actual use of the storage device.

When address search section 10 acquires an address, it uses that acquired address to search the addresses of address field 12 in table 11. When the acquired address hits an address in address field 12 (address hit), address search section 10 outputs to frequent use data storage section 20 the tag related to the data index stored in data index field 14 for the hit address. The acquired address for write data is output to write-read control device 120 whether or not it hits an address in address field 12. When an acquired address for read data does not hit an address in address field 12 (read miss), it is output to write-read control device 120, but when it does hit (read hit), it is not output to write-read control device 120. This is because when an acquired address for read data does hit an address in address field 12 (read hit), it is not an address for acquiring read data from the storage device, and therefore the frequent use data stored in frequent use data storage section 20 is offered as the read data. At this time, address search section 10 instructs the selection of read data in read data selector 90, so as to select the frequent use data stored in frequent use data storage section 20 as the read data.

When the write data input by data comparator 30 hits frequent use data stored in frequent use data storage section 20 (data hit), address search section 10 is notified by a tag for the hit frequent use data from frequent use data storage section 20, it receives an instruction to overwrite the storage address for the oldest tag within address field 12 with the acquired address for that write data, and it performs the overwriting. The storage address for the oldest tag within address field 12 is determined by checking the flags in flag field 13. By this overwriting, the entry that possessed the storage address for the oldest tag stores the acquired address in address field 12, stores a new flag in flag field 13, and stores the notified tag in data index field 14.

Additionally, when the acquired address for the input write data hits a storage address in address search section 10 and the write data does not hit the frequent use data specified by frequent use data storage section 20, address search section 10 is instructed by frequent use data storage section 20 to perform invalidation of the hit storage address (invalidate), and the hit storage address is invalidated. Invalidation is performed by setting a prescribed value, 0 for example, for the flag of flag field 13.

Frequent use data storage section 20 stores a tag creating a relationship between the plurality of data within the storage device to be accessed and the data index within address search section 10. In addition, frequent use data storage section 20 provides each stored frequent use data to data comparator 30 to enable data comparator 30 to compare that data with the write data from on-chip bus 110.

Figure 3:
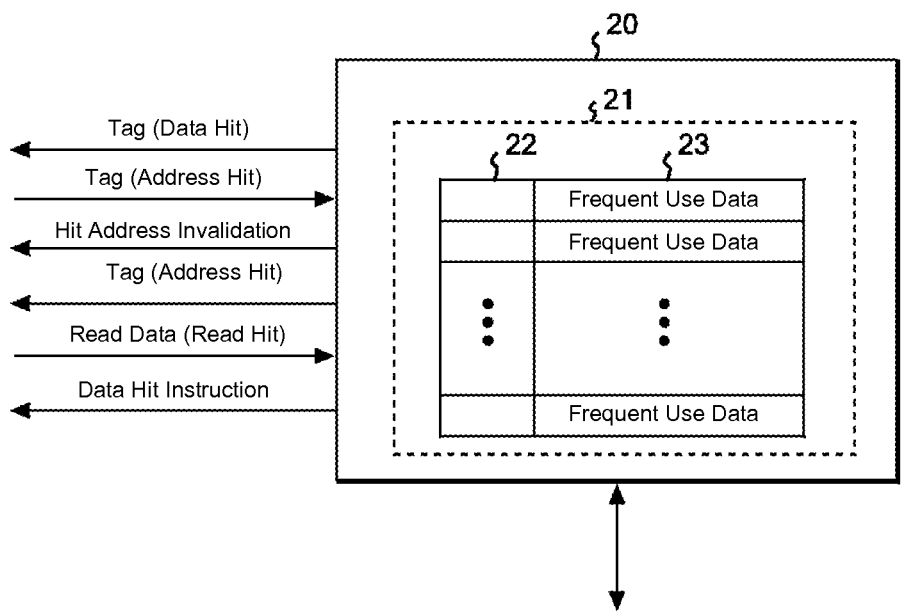
FIG. 3 is a drawing that shows a structural example of the frequent use data storage section in the storage device access system according to an embodiment of the present invention.

FIG. 3 shows a structural example of frequent use data storage section 20. Frequent use data storage section 20 comprises table 21 constituted of a plurality of entries. The entry quantity can be discretionarily set, but it is preferable to set it corresponding to the frequent use data quantity stored in frequent use data storage section 20 frequent use data storage section 20. Each frequent use data can be specified by a plurality of differing addresses, and so table 21 contains entry quantity at least as numerous as the entry quantity in table 11. Within each entry in table 21, there is established tag field 22 for storing a tag and frequent use data field 23 for storing frequent use data prepared in advance and corresponding to each tag. The method of storing the frequent use data in frequent use data field 23 is not specifically limited, but, for example, there can be arranging to store frequent use data in frequent use data field 23 with correspondence to an access frequency order, based on an access frequency that can be obtained from the flag of address search section 10.

For each entry, within tag field 22 there is stored a tag that corresponds to the data index stored in data index field 14 of address search section 10. Accordingly, in tag field 22 there is stored a numerical value assigned in order from 0, for example, identically to that for data index field 14. In frequent use data field 23 there is stored frequent used data that possesses the data length at which writing and reading is performed is suitable units, such as the basic data length written from and read to on-chip bus 110, the pixel length for an image, or the line length for cache. The frequent use data is for example A110 or A111 as a 32-bit continuation of 0 or 1, or is a data pattern obtained by analyzing the execution code when compiling a program.

When an acquired address hits a stored address at address search section 10 (address hit), frequent use data storage section 20 acquires from address search section 10 a tag that corresponds to the data index for the stored addresses that have been hit. Frequent use data storage section 20 detects that the tag matches a tag from tag field 22 of table 21 that corresponds to the acquired data index, and it identifies the frequent use data that corresponds to the matched tag.

When writing, the identified frequent use data is compared with the write data from on-chip bus 110 by data comparator 30, as it was compared to other frequent use data stored in frequent use data field 23. At data comparator 30, when the identified frequent used data is write data and it has hit other frequent used data, frequent use data storage section 20 receives an instruction that the frequent use data from data comparator 30 has hit (data hit instruction), it notifies address search section 10 with a tag stored in tag field 22 of the entry for the hit frequent used data (data hit), and it instructs to overwrite the storage address of the oldest tag in address search section 10 with the acquired address. When the write data has not hit identified frequent used data in data comparator 30, frequent use data storage section 20 instructs address search section 10 to invalidate the storage address that has been hit at address search section 10 (hit address invalidation). When reading, the identified frequent use data (read hit) is provided to read data selector 90 as read data.

Figure 4:
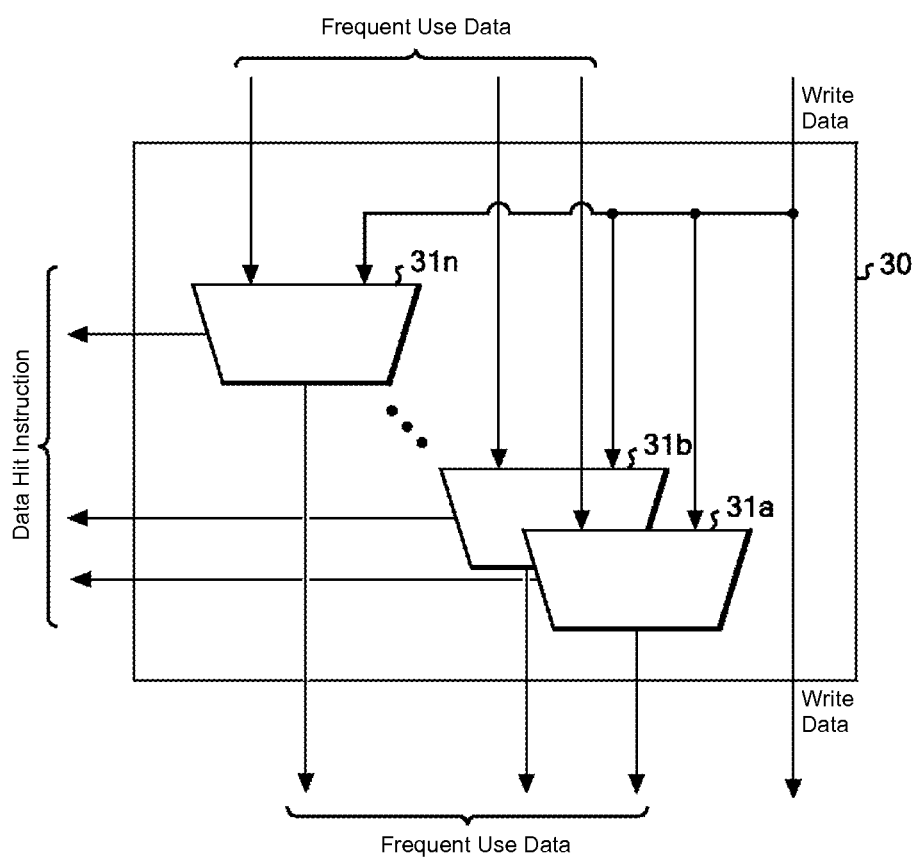
FIG. 4 is a drawing that shows a structural example of the data comparator in the storage device access system according to an embodiment of the present invention.

Data comparator 30 acquires from frequent use data storage section 20 the stored frequent use data and compares it with the write data input from on-chip bus 110. FIG. 4 shows a structural example of data comparator 30. Data comparator 30 includes the plurality of comparators 31a, 31b . . . 31n, which compare each of corresponding frequent used data with the write data. When write data hits the frequent use data, the plurality of comparators 31a, 31b . . . 31n create an instruction for the hit (data hit) and output the instruction to frequent use data storage section 20 and write data selector 80. After each input frequent use data has been compared, the plurality of comparators 31a, 31b . . . 31n provide the data to compression engine 50 of compression-expansion section 40. The write data is also provided to compression engine 50 form data comparator 30.

Figure 5:
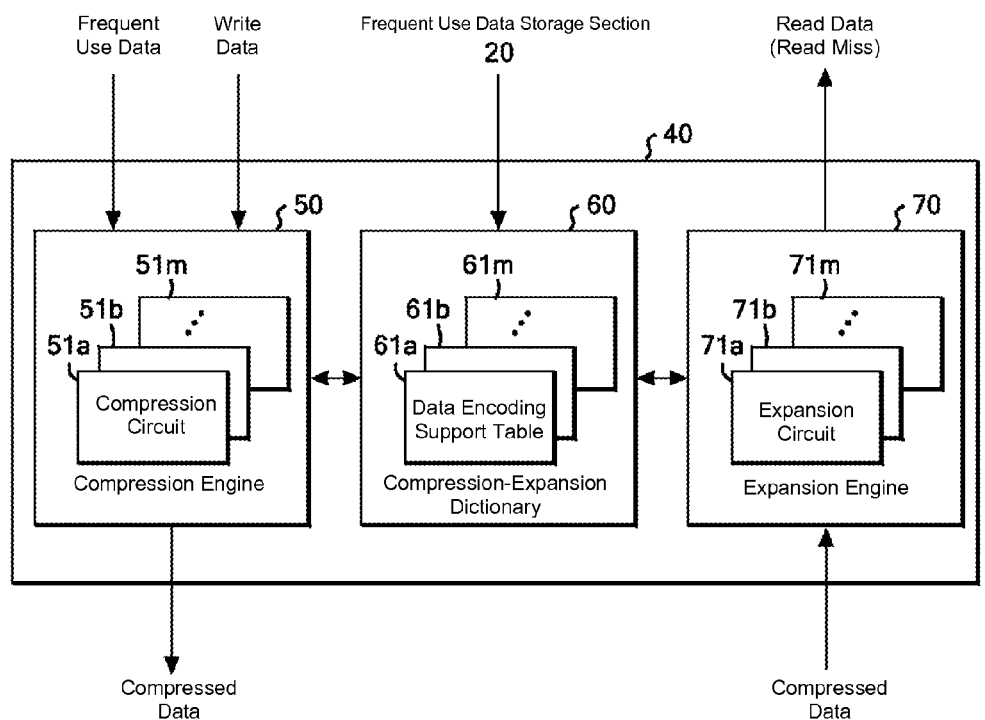
FIG. 5 is a drawing that shows a structural example of the compression-expansion section in the storage device access system according to an embodiment of the present invention.

Compression-expansion section 40 acquires and compresses write data and frequent use data from data comparator 30, and it acquires and expands read data from write-read control device 120 relative to the storage device. FIG. 5 shows a structural example of compression-expansion section 40. Compression-expansion section 40 comprises compression engine 50, compression-expansion dictionary 60, and expansion engine 70. Compression engine 50 includes the plurality of compression circuits 51a, 51b . . . 51m which differ by compression method and compress the write data and frequent use data acquired from data comparator 30. Compression circuits 51a, 51b . . . 51m are circuits that use hardware to produce algorithms of a lossless compression method (LHA, etc.), for example. Compression engine 50 uses the compression circuits to compress the write data and frequent use data, and it provides the data to write data selector 80. Expansion engine 70 corresponds to compression engine 50, and it includes the plurality of expansion circuits 71a, 71b . . . 71m which differ by expansion method and expand the read data acquired from write-read control device 120.

Expansion engine 70 uses the expansion circuits to expand the read data, and it provides the data to read data selector 90. The acquiring of read data from write-read control device 120 occurs when there is no frequent use data in frequent use data storage section 20 to become the read data (read miss). Compression-expansion dictionary 60 includes data encoding support table 61a, 61b . . . 61m, which performs correspondence of the data to be compressed by compression circuits 51a, 51b . . . 51m with the encoding that expands the data at expansion circuits 71a, 71b . . . 71m. It is also acceptable to structure such that data stored in frequent use data storage section 20 is data compressed by data encoding support table 61a, 61b . . . 61m, thereby corresponding to both compression circuits 51a, 51b . . . 51m and expansion circuits 71a, 71b . . . 71m.

Figure 6:
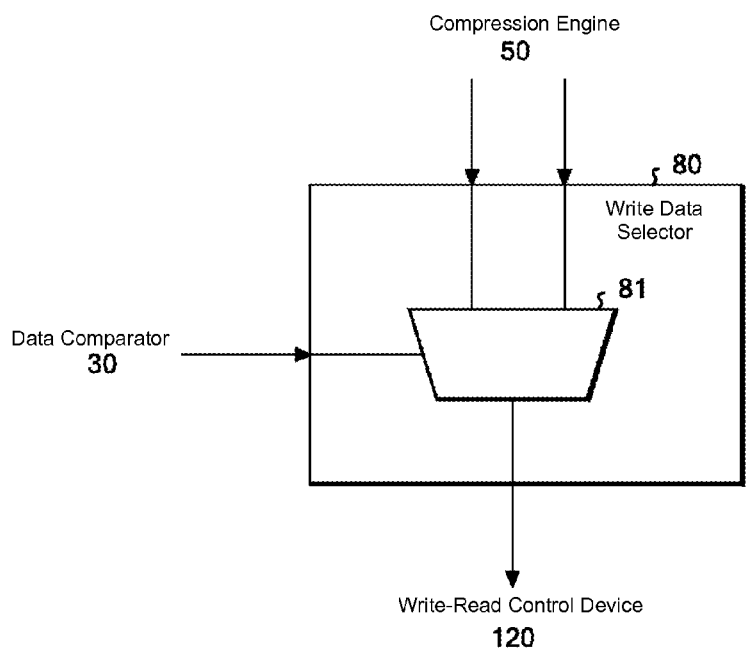
FIG. 6 is a drawing that shows a structural example of the write data selector in the storage device access system according to an embodiment of the present invention.

Write data selector 80 acquires the write data and frequent use data compressed by compression-expansion section 40, and, by instruction from data comparator 30, it selects either of the compressed write data or the compressed frequent use data registered in compression-expansion dictionary 60. FIG. 6 shows a structural example of write data selector 80. Write data selector 80 comprises selector 81 for responding to the instruction from data comparator 30, for selecting either of the compressed write data or the compressed frequent use data, and for providing the data to write-read control device 120.

Figure 7:
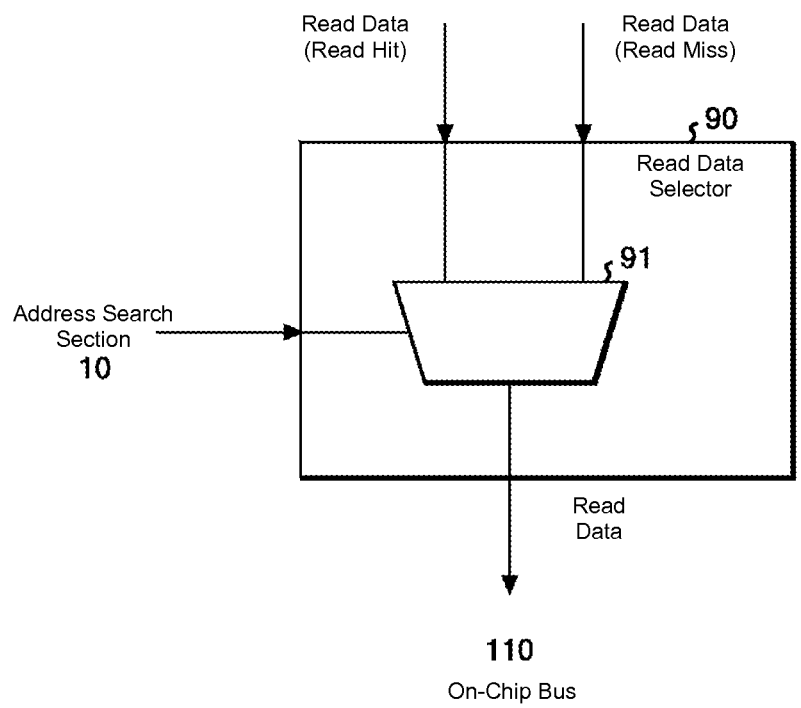
FIG. 7 is a drawing that shows a structural example of the read data selector in the storage device access system according to an embodiment of the present invention.

When the address of the read data acquired from on-chip bus 110 has hit a storage address in address search section 10 (read hit), read data selector 90 acquires from frequent use data storage section 20 the identified frequent use data within the frequent use data; and, when the data has not hit (read miss), it acquires the read data read from write-read control device 120 relative to the storage device and expanded by compression-expansion section 40. Read data selector 90, by instruction from data comparator 30, selects either of the identified frequent use data or the expanded read data. FIG. 7 shows a structural example of read data selector 90. Read data selector 90 comprises selector 91 for responding to the instruction from address search section 10, for selecting either of the identified frequent use data or the expanded read data, and for providing the data to on-chip bus 110.

Figure 8:
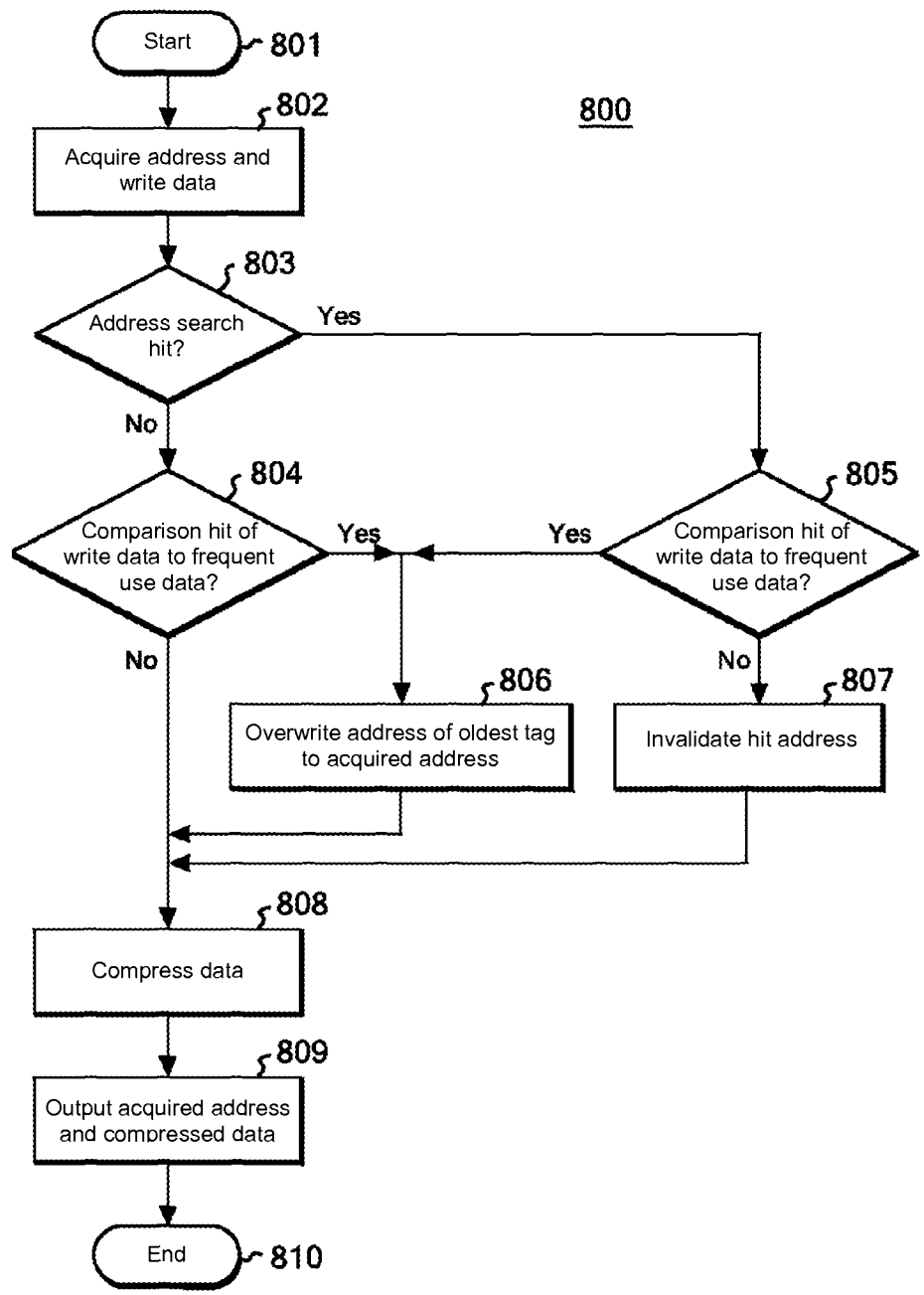
FIG. 8 is a drawing that shows the flow of write processing in the storage device access system according to an embodiment of the present invention.

FIG. 8 shows the flow of write processing in storage device access system 100. Access system 100 starts at Step 801 when there is input of an address or write data from on-chip bus 110. The address or write data input at Step 802 is acquired by access system 100, and at Step 803 an address search is performed for the acquired address by address search section 10 searching the stored addresses. At Step 803, when the performed address search results in no hit (No), the process advances to Step 804, and when a hit (Yes), it advances to Step 805. At both Step 804 and Step 805, data comparator 30 compares the write data with frequent use data from frequent use data storage section 20.

When the data comparison at Step 804 or Step 805 yields a data hit (match) (Yes), the process advances to Step 806, and address search section 10, notified by frequent use data storage section 20 with a tag for the hit frequent use data, receives an instruction to overwrite the storage address with the oldest tag within address field 12 to the acquired address, and performs the overwrite. When the data comparison at Step 805 results in no data hit (No), the process advances to Step 807, and address search section 10, instructed by frequent use data storage section 20 to perform invalidation of the hit storage address (invalidate), invalidates the hit storage address. When the data comparison at Step 804 results in no data hit (No) and the hit storage address has been invalidated at Step 807, the process advances to Step 808 and the write data is compressed by compression-expansion section 40. When the storage address with the oldest tag is overwritten to the acquired address at Step 806, the write data and hit frequent use data are compressed by compression-expansion section 40.

At Step 809, after the data has been compressed, the acquired address is output by address search section 10 when other than a read hit, and by the instruction of data comparator 30 there is selection and output from write data selector 80 of either the compressed write data or the compress frequent use data registered in compression-expansion dictionary 60. When acquired address and compressed data has been output at Step 809, the process advances to Step 810, and address search section 10 terminates the data write process.

Figure 9:
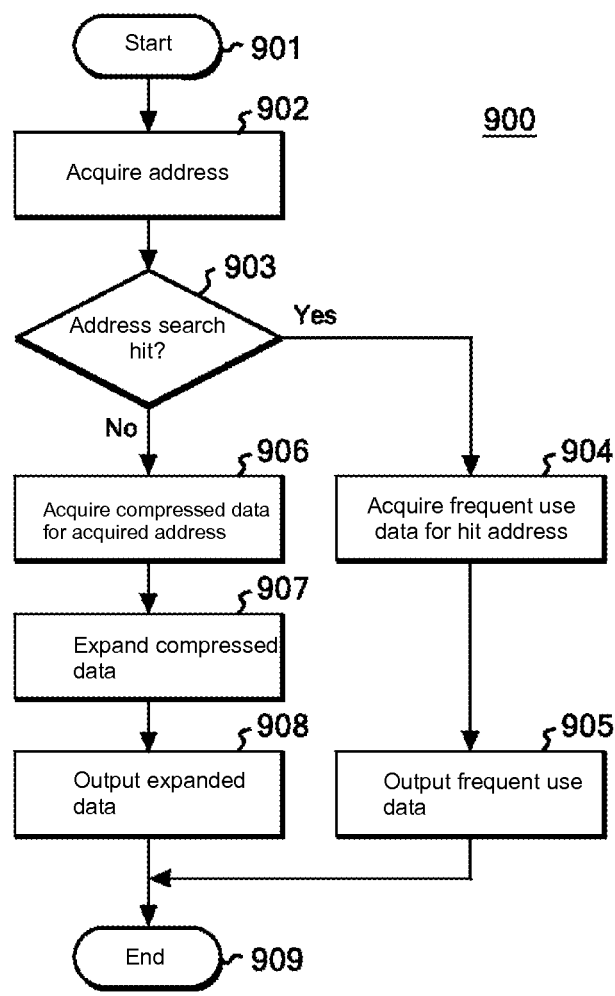
FIG. 9 is a drawing that shows the flow of read processing in the storage device access system according to an embodiment of the present invention.

FIG. 9 shows the flow of read processing in storage device access system 100. Access system 100 starts at Step 901 when there is input of an address from on-chip bus 110. The address input at Step 902 is acquired by access system 100, and at Step 903 an address search is performed for the acquired address by address search section 10 searching the stored addresses. At Step 903, when the performed address search results in a hit (Yes), specifically, when a read hit, the process advances to Step 904, and when not a hit (No), specifically, when a read miss, it advances to Step 906.

When a read hit, at Step 904 there is acquired from frequent use data storage section 20 the frequent use data that hit the acquired address, and at Step 905 the frequent use data is selected and output as read data. On the other hand, when a read miss, at Step 906 the acquired address is output to write-read control device 120 from address search section 10, and the compressed data for that address is acquired from the storage device. At Step 907 the acquired compressed data is expanded by compression-expansion section 40. At Step 908, the expanded data is acquired from compression-expansion section 40 by read data selector 90, which selects and outputs the data as read data.

When either the frequent used data is output as read data at Step 905 or the expanded data is output as read data at Step 908, the process advances to Step 909 and address search section 10 terminates the read process.

This invention was described above using an embodiment, but the technical scope of this invention is not limited to the scope recorded in the embodiment. Various modifications and improvements can be implemented with the embodiment, and such a modified or improved mode will of course also be incorporated within the technical scope of this invention.

What is claimed is:

1. A storage device access system for writing and reading data relative to a storage device, the system comprising:
    an address search section for i) storing an address for a plurality of frequent use data and a data index assigned to the address, ii) acquiring the address of write or read data, and iii) searching stored addresses with the acquired address;
    a frequent use data storage section for i) storing a tag related to the plurality of frequent use data and the data index, ii) acquiring the data index when an address acquired by the address search section has hit a stored address, and iii) identifying frequent use data that corresponds to the tag related to the acquired data index;
    a data comparator for i) acquiring the frequent use data from the frequent use data storage section, ii) comparing the data with the write data, and iii) identifying frequent use data that has hit the write data;
    a compression-expansion section for i) acquiring and compressing the write data and the frequent use data from the data comparator, and ii) acquiring and expanding the read data from the storage device;
    a write data selector for i) acquiring the write data and the frequent use data compressed by the compression-expansion section, ii) receiving an instruction from the data comparator, and iii) selecting either of the compressed write data or the frequent use data; and
    a read data selector for i) acquiring from the frequent use data storage section the identified read data within the frequent use data when the address of the read data has hit the storage address of the address search section, ii) acquiring the read data read from the storage device and expanded by the compression-expansion section when the data does not hit, iii) selecting either the identified read data or the expanded read data under an instruction from the address search section.

2. The storage device access system according to claim 1 wherein, when the frequent use data storage section has been instructed by the data comparator that the write data has hit the frequent use data, the frequent use data storage section notifies the address search section of the tag for the hit frequent use data, and instructs overwriting of the stored address with the oldest tag in the address search section to the acquired address, and when the frequent use data storage section has been instructed by the data comparator that the acquired address has hit the stored address in the address search section whereas the write data has not hit the frequent use data identified by the corresponding tag, the frequent use data storage section instructs the address search section to perform invalidation of the hit stored address.

3. The storage device access system according to claim 1 wherein the address search section comprises a table possessing for each entry i) an address field for storing the address, ii) a flag field for storing a flag that shows the number of times write or read has been performed for the address, and iii) a data index field for storing a data index for the address of the address field, wherein the table comprises a plurality of entries.

4. The storage device access system according to claim 2 wherein, when the frequent use data storage section has instructed the address search section to perform invalidation of the hit stored address, the flag in the flag field of the entry for the hit stored address is set to a prescribed value that expresses invalidation.

5. The storage device access system according to claim 1, wherein the frequent use data storage section comprises i) a table possessing for each entry a tag field for storing the tag, and ii) a frequent use data field for storing frequent use data corresponding to the tag of the tag field, wherein the table comprises a plurality of entries.

6. The storage device access system according to claim 5 wherein the frequent use data field stores data for a basic data length with high frequent use, wherein the basic data length is recorded in the storage device.

7. The storage device access system according to claim 1, wherein the data comparator comprises a plurality of comparators for comparing each corresponding frequent use data with the write data.

8. The storage device access system according to any of claim 1, wherein the compression-expansion section comprises i) a compression engine providing at least one compression circuit for compressing the write data and the read data, ii) an expansion engine providing at least one expansion circuit for expanding the read data from the storage device, and iii) a compression-expansion dictionary section providing at least one data encoding support table for supporting encoding to expand with an expansion circuit the data compressed by the compression circuit.

9. The storage device access system according to claim 8, wherein the data encoding support table for supports correspondence between the expansion circuit and the compression circuit, and wherein the data of the data encoding support table is frequent use data stored in the frequent use data storage section.

10. The storage device access system according to claim 1, wherein the write data selector comprises a selector for selecting, in response to an instruction from the data comparator, one of i) the compressed write data and ii) the frequent use data.

11. The storage device access system according to claim 1, wherein the read data selector comprises a selector for selecting, in response to an instruction from the data comparator, one of i) the identified read data and ii) the expanded read data.

* * * * *